M. S. CURTIS.
Hose-Nozzle.

No. 161,763.

Patented April 6, 1875.

Witnesses:
R. M. Barr
Aland Boyle

Inventor:
Mosely S. Curtis
By his Attorneys
Leggett & Leggett

THE GRAPHIC CO.PHOTO-LITH.39 & 41 PARK PLACE,N.Y.

UNITED STATES PATENT OFFICE.

MOSELY S. CURTIS, OF LONG ISLAND CITY, ASSIGNOR OF ONE-HALF TO WALTER McCOLLUM, OF NEW YORK, N. Y.

IMPROVEMENT IN HOSE-NOZZLES.

Specification forming part of Letters Patent No. 161,763, dated April 6, 1875; application filed July 1, 1874.

*To all whom it may concern:*

Be it known that I, MOSELY S. CURTIS, of Long Island City, in the county of Queens and State of New York, have invented certain new and useful Improvements in Nozzles for Hose; and I do hereby declare the following to be a full, clear, and exact description of the invention, such as will enable others skilled in the art to which it pertains to make and use it, reference being had to the accompanying drawings, which form a part of this specification.

My invention relates to an improvement in nozzles of hose, whereby the sectional area of the hose-nozzle at its end may be contracted; and consists in attaching rigidly to the end of the said nozzle a tip of flexible rubber of a peculiar contour, and an incasing cap or sleeve, adjusted to be forced over the said rubber tip in a direction from the end of the said nozzle, causing the tip to stretch longitudinally, and which, by its retractile force, is drawn back to a certain degree through the small end of the said cap or sleeve, thereby diminishing the size of its bore, as hereinafter set forth and claimed.

Figure 1:
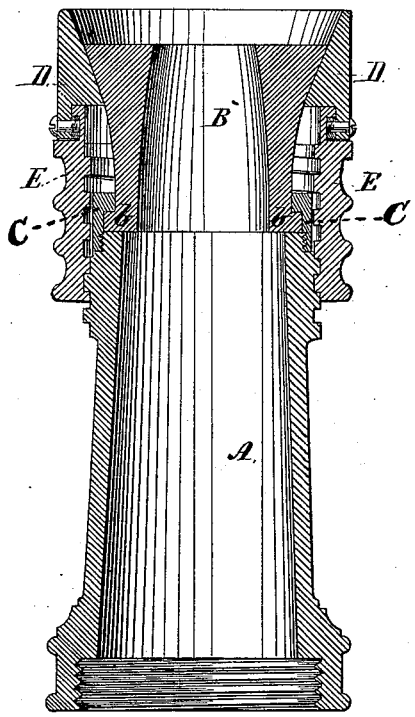
Figure 2:
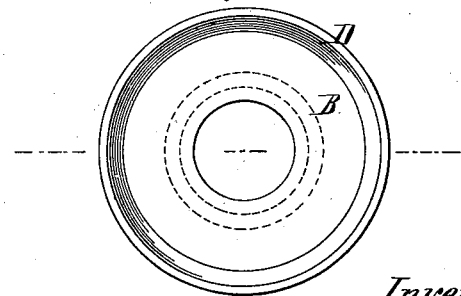

In the drawing, Figure 1 is a view in section of a nozzle with my invention upon it. Fig. 2 is a view of the end of the nozzle.

A is a nozzle. B is an end or tip of flexible rubber, provided at the bottom with a flange, $b$, resting against the end of the nozzle. C is an annular sleeve, having an inwardly-projecting flange at its top, that rests upon the flange $b$ of the tip B. The sleeve C is screwed upon the nozzle A, and thereby rigidly fastens the rubber tip thereto. D is a sleeve that has a larger opening at its outer than it has at its inner end, and incases the upper or larger portion of the tip B. The sleeve D is attached by a swivel-joint to the nut E, so as not to turn with the said nut. The nut E screws upon the end of the nozzle A, and, as it is run in either direction, carries with it the sleeve D.

The operation of the device is as follows: When for any reason the force of the water is not great enough to carry a stream to a given point because of the stream being too large, the area of the mouth of the nozzle is decreased by turning the nut E in a direction to force the sleeve in a direction from the end of the nozzle. As the sleeve D binds upon the rubber tip, the latter is caused to stretch, because its other end is rigidly attached to the end of the nozzle. As the tip stretches, it e force becomes greater and greater, and draws the big end of the tip partially back through the small end of the sleeve D, and thereby diminishes the sectional area of the bore through the tip.

The shape of the tip that I prefer to use is the inverted frustum of a cone having a true cylindrical bore. That represented in the drawing is such a tip partially stretched, so as to contract one end of its bore; but it is evident that other forms of tip serving a like purpose, and of such shape as to be similarly stretched by a sleeve, D, might be employed without departing from the principle of my invention.

The sleeve should be of such a form, substantially as shown, as to grasp the rubber below the large end thereof, so that the rubber, by its contractile force, may be diminished in section as it recedes through the small end of the said sleeve, as the latter is imparting the stretch.

Instead of securing the tip to the nozzle by means of the flange $b$ and sleeve C, any other suitable means may be employed that will rigidly fasten the tip to the end of the nozzle.

I am aware that rubber has been employed in this connection, and the bore diminished by mechanical compression of the said rubber; but I am not aware of any device wherein the bore is diminished by the reacting contractile force of the rubber itself, the rubber being stretched by mechanical means.

The advantage of thus decreasing the area of the bore by stretching over that of compression is, that in the case of depressing of the pipe to close the orifice, as the size of the orifice is decreased, the length of the bearing for the stream is decreased, which increases the violence of action of the water in passing through the nozzle. In the case of the compressed tip the character of the taper is not the same with various sizes of openings, for, as the inner edges are thrown toward the center, the direction of the stream is broken more and more abruptly, while the opposing currents thus caused decrease the force and the solidity of the stream; whereas, in my device, the direction of the current is not abruptly changed, and the length of the incline in the rubber tip is sufficient to give form and solidity to the stream. As the orifice is decreased the rubber tip, being unconfined, stretches outward, thus making the incline more uniform and lengthening the bearing for the stream. Thus the stream is discharged from the orifice without any counter-current, which current is unavoidable when the direction of the water is abruptly changed, as in the compressed nozzle.

What I claim is—

1. A nozzle provided on its end with a flexible rubber tubular tip, attached rigidly thereto, the said tip being of inverted bell shape, or inverted conical exterior form, in combination with a stretching-sleeve of similar internal contour, encircling the said tip, and arranged to be forced in a direction from the end of the nozzle, the rubber acting by its own retractile force to draw itself back through the small end of the sleeve, thereby diminishing its bore.

2. The combination of nozzle A, tip B, stretching-sleeve D, and mechanism for driving the said sleeve in a direction from the end of the nozzle, substantially as and for the purposes set forth.

3. The tip B, made of flexible rubber, of inverted frustum of a cone, or inverted conical exterior form, and provided with a cylindrical bore, substantially as described.

In testimony that I claim the foregoing, I have hereunto set my hand this 22d day of June, 1874.

MOSELY S. CURTIS.

Witnesses:
B. D. PENFIELD,
H. A. FARON.